(12) United States Patent
Aonuma et al.

(10) Patent No.: US 8,122,358 B2
(45) Date of Patent: Feb. 21, 2012

(54) METHOD AND APPARATUS FOR DISPLAYING USER COMMENT

(75) Inventors: Hiroaki Aonuma, Kanagawa (JP); Toru Morita, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 745 days.

(21) Appl. No.: 11/758,254

(22) Filed: Jun. 5, 2007

(65) Prior Publication Data

US 2008/0016446 A1 Jan. 17, 2008

(30) Foreign Application Priority Data

Jul. 14, 2006 (JP) .................................. 2006-194831

(51) Int. Cl.
*G06F 3/00* (2006.01)
(52) U.S. Cl. ..................... 715/733; 715/736; 715/810
(58) Field of Classification Search ................... 715/734, 715/758, 810, 733, 736
See application file for complete search history.

(56) References Cited

U.S. PATENT DOCUMENTS 6,690,391 B1 * 2/2004 Proehl et al. .................. 715/720
6,981,223 B2 * 12/2005 Becker et al. ................. 715/753
7,536,653 B2 * 5/2009 Badovinac et al. ........... 715/810
7,607,091 B2 * 10/2009 Song .............................. 715/734
2005/0165880 A1 * 7/2005 Moody et al. ................. 709/200

FOREIGN PATENT DOCUMENTS

JP   2002-336552       11/2002
JP   2002336552 A  *  11/2002
JP   2006-33094         2/2006

OTHER PUBLICATIONS

Notification of Reason(s) for Refusal mailed Jul. 29, 2008, from the corresponding Japanese Application.

* cited by examiner

*Primary Examiner* — Omar Abdul-Ali
(74) *Attorney, Agent, or Firm* — Katten Muchin Rosenman LLP (57) ABSTRACT

A communication management technology of improved convenience is provided. A game apparatus includes: a registration unit which registers other terminals accessible through a network as participants to notify each other's status to; a status information acquisition unit which acquires information indicating the statuses of the registered terminals through the network; a list display unit which displays a list of the registered terminals on a screen; and a comment display unit which displays a user-selected terminal distinctively from the rest of the list, and if information indicating the status of the terminal includes any comment from a user of the terminal to a user or users of a terminal or terminals by which the terminal is registered as a participant of notification, displays the comment on the screen.

4 Claims, 12 Drawing Sheets

| Terminal ID (142) | User name (144) | Friend list (146) | Registration-requested list (148) |
|---|---|---|---|
| 0001 | Mie | 0543, 0544, 4571 | 1644, 4450 |
| 0002 | Toro | 1052, 1749, 2408, 3117, 4874 | 4276 |
| ... | ... | ... | |

| Terminal ID | User name | Icon filename | Communication status | Video chat | Voice chat | Title | Comment |
|---|---|---|---|---|---|---|---|
| 152 | 154 | 156 | 158 | 160 | 162 | 164 | 168 |
| 0001 | Mie | 0001.ico | Log-off | — | — | — | — |
| 0002 | Toro | 0002.ico | Log-on | Available | Available | Othello game | — |
| ... | ... | ... | ... | ... | ... | ... | ... |
| 1052 | Pierre | 1052.ico | Log-on | Available | Available | Othello game | Player wanted! |
| ... | ... | ... | ... | ... | ... | ... | ... |

| Terminal ID | User name | Icon filename | Communication status | Video chat | Voice chat | Title | Comment |
|---|---|---|---|---|---|---|---|
| 1052 | Pierre | 1052.ico | Log-on | Available | Available | Othello game | Player wanted! |
| 1749 | Jun | 1749.ico | Log-on | Not available | Not available | Classical music | — |
| 2408 | Ai | 2408.ico | Log-off | — | — | — | — |
| 3117 | Tiger | 3117.ico | Log-off | — | — | — | — |
| 4276 | Jas | 4276.ico | Registration requested | — | — | — | — |
| ... | ... | ... | ... | ... | ... | ... | ... |

FIG.12

METHOD AND APPARATUS FOR DISPLAYING USER COMMENT

BACKGROUND OF THE INVENTION

1. Field of the Invention

The present invention relates to communication management technology, and in particular, to a terminal apparatus, a communication management method, and a program for notifying the own status to other terminals accessible through a network.

2. Description of the Related Art

With the improvement in network infrastructures and the prevalence of such terminals as cellular phones and personal computers, communications via networks are now assuming a dominant position. For example, messenger services for exchanging messages to enjoy conversation with registered friends and social networking services for publishing diaries and the like to allow particular friends to exchange diary entries and the like are in widespread use. Game apparatuses are also being equipped with communication facilities, and becoming capable of real-time matches with users located at other game terminals over a network.

In messenger services, it is typically possible to recognize if registered participants are logging in. Social networking services also provide information on whether or not users have logged in recently. The inventor has developed the idea, however, that a function for ascertaining the statuses of participants in more detail can be provided to improve user convenience, particularly in a network of game apparatuses.

SUMMARY OF THE INVENTION

The present invention has been developed in view of the foregoing circumstances. It is thus a general purpose of the present invention to provide a communication management technology that improves user convenience.

One embodiment of the present invention relates to a terminal apparatus. This terminal apparatus includes: a registration unit which registers other terminals which are accessible through a network as participants to notify each other's status to; an acquisition unit which acquires information indicating the statuses of the registered terminals through the network; a list display unit which displays a list of the registered terminals on a screen; and a comment display unit which displays a user-selected terminal distinctively from the rest of the list, and if information indicating the status of the terminal includes any comment from a user of the terminal to a user or users of a terminal or terminals by which the terminal is registered as a participant of notification, displays the comment on the screen.

It should be appreciated that any combinations of the foregoing components, and any conversions of expressions of the present invention between methods, apparatuses, systems, and the like are also intended to constitute applicable embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A game system according to the present embodiment is configured so that game apparatuses, when in connection with the network, can browse the statuses of other game apparatuses that are registered as participants to notify each other's status to. The game system of the present embodiment also provides a function by which the users of the game apparatuses can notify the users of the other game apparatuses that are registered of comments, with these comments describing their own statuses in detail. For example, such comments as "Wanted co-player for my new game" and "Do not request a chat because I'm concentrating on game play" may be registered and notified to the users of the other game apparatuses. This makes it possible for participants to notify others of their own statuses in more detail for improved user convenience.

The game apparatuses display a list of the statuses of the other registered game apparatuses on their menu screen. For comment-registering users, this list shows the user comments along with information indicating the statuses of their game apparatuses. In the present embodiment, comments are displayed regarding focused game apparatuses alone for the sake of screen viewability. This can further improve user convenience.

Figure 1:
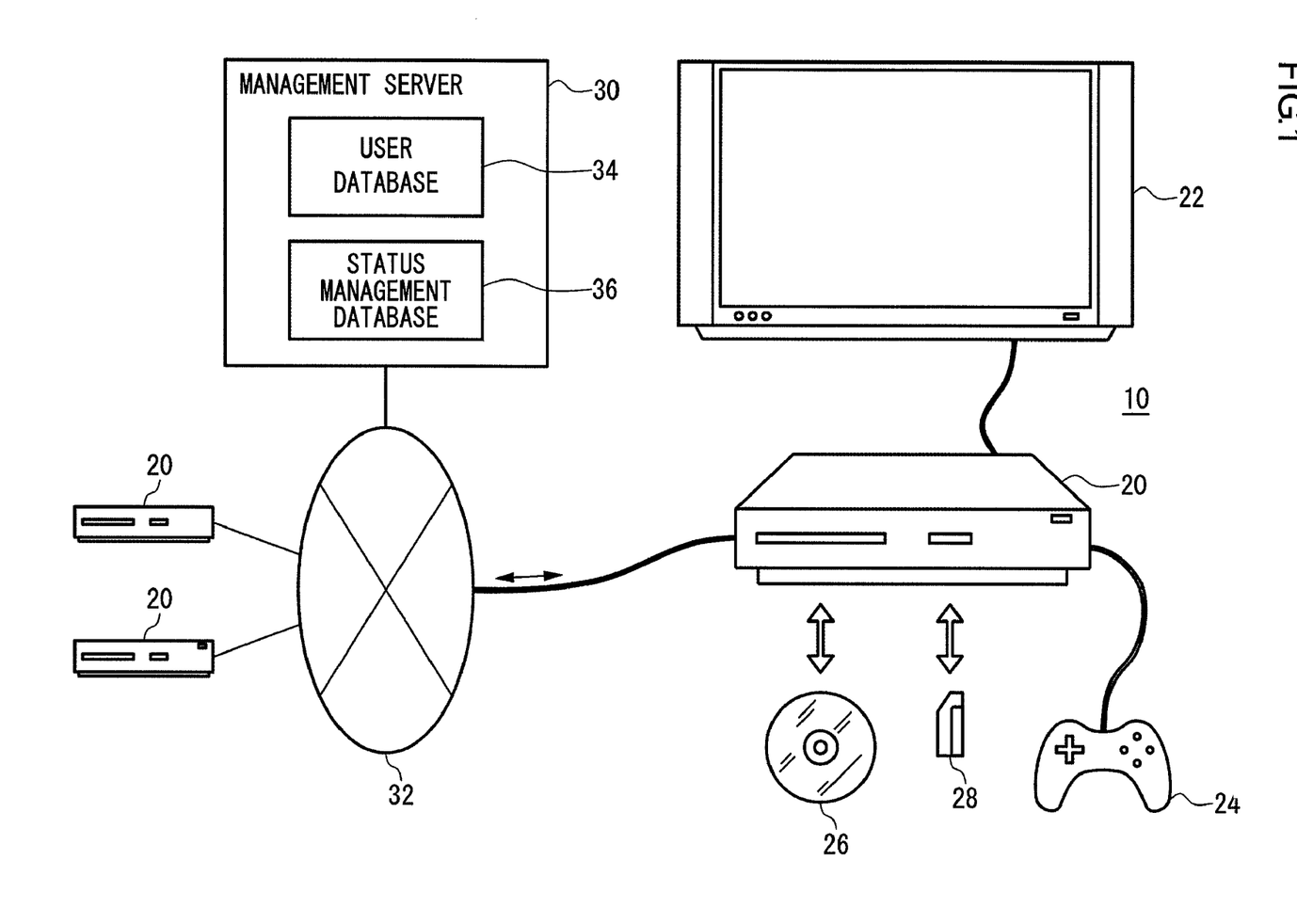
FIG. 1 is a diagram showing the basic configuration of a game system according to an embodiment.

FIG. 1 shows the basic configuration of the game system according to the present embodiment. In the game system 10, a plurality of game apparatuses 20 is connected so as to be capable of communication over a network 32 such as the Internet. Versus games can then be played and messages can be exchanged between the game apparatuses 20. The game system 10 also includes a management server 30 which is connected to the network 32. The management server 32 ascertains the statuses of the respective game apparatuses 20, and notifies each game apparatus 20 of the statuses of the other game apparatuses 20.

Each of the game apparatuses 20 is connected with a display device 22 such as a television set, and a controller 24. The display device 22 displays images generated by the game apparatus 20. The display device 22 also has speakers which output sound generated by the game apparatus 20. The controller 24 inputs user operations to the game apparatus 20. The game apparatus 20 includes the facilities to read and write data from/to an optical disk 26 such as a DVD and a CD, a removable memory card 28, and the like. It executes a game program stored in the optical disk 26, for example, and records saved data on the memory card 28. The game apparatus 20 also includes the functions of a multimedia player. It can read data on a movie, music album, and the like from the optical disk 26 for reproduction, and read data on photographic images, videos, and the like from the memory card 28 for reproduction.

The game apparatus 20 displays a menu screen for accepting user instructions to reproduce contents and execute games on the display device 22. A list of other game apparatuses 20 (hereinafter, referred to as "friends") that are registered as participants to notify each other's status to (hereinafter, referred to as a "friend list") appears on this menu screen, displaying information indicating the statuses of the respective friends.

The management server 30 manages a user database 34 which contains the friend lists of the users, and a status management database 36 which contains information indicating the statuses of the users. The management server 30 is configured to provide the functions of: accepting registration of friends from the game apparatuses 20 and registering the same into the user database 34; and accepting information indicating own statuses from the game apparatuses 20, registering the same into the status management database 36, and notifying the information to game apparatuses 20 that are registered as the friends of the game apparatuses 20.

Figure 2:
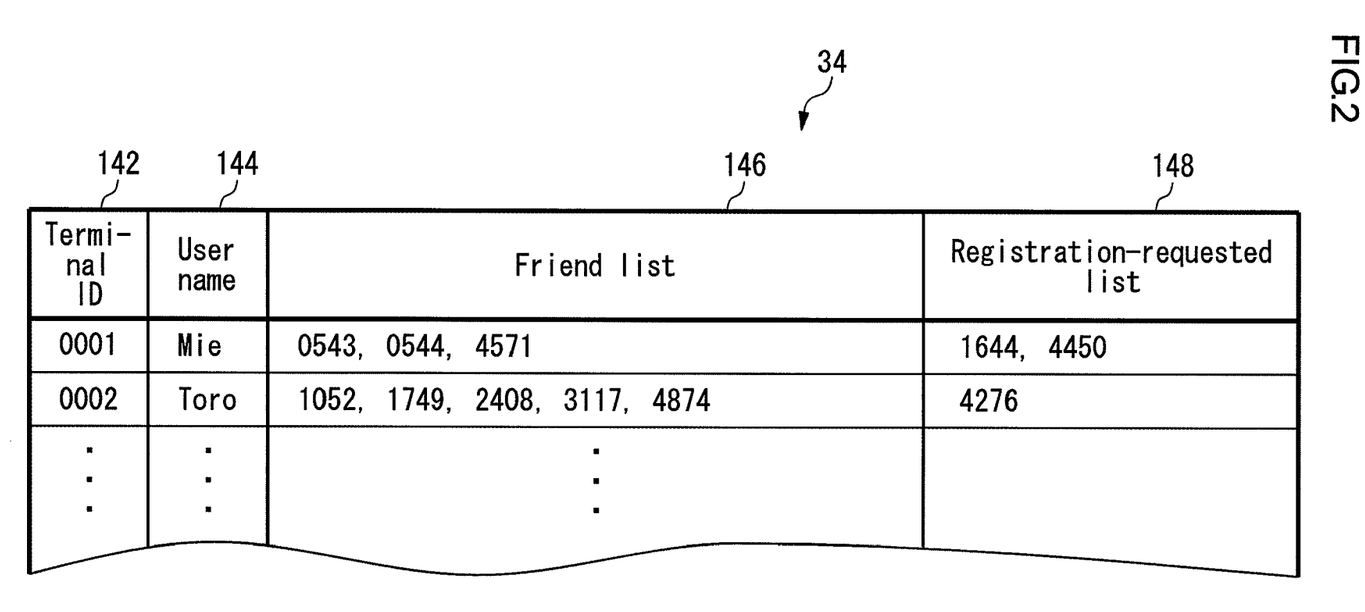
FIG. 2 is a diagram showing an example of internal data of a user database.

FIG. 2 shows an example of the internal data in the user database 34. The user database 34 has a terminal ID field 142, a username field 144, a friend list field 146, and a registration-requested list field 148. The terminal ID field 142 stores the terminal IDs of the game apparatuses 20. The username field 144 stores the names, nicknames, or the like of the users of the game apparatuses 20. The friend list field 146 stores the lists of friend terminal IDs registered by the users. The registration-requested list field 148 stores lists of terminal IDs that the users are requesting to register as friends.

Figure 3:
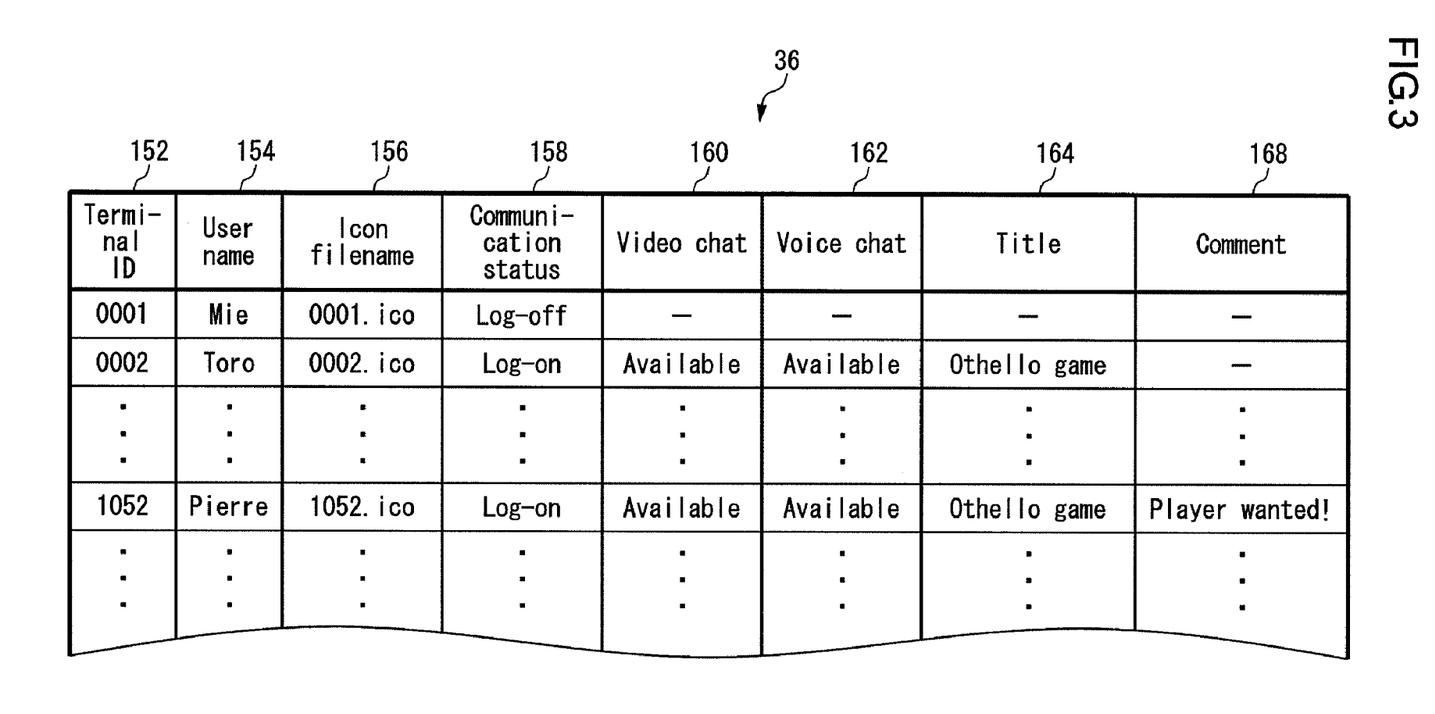
FIG. 3 is a diagram showing an example of internal data of a status management database.

FIG. 3 shows an example of the internal data in the status management database 36. The status management database 36 has a terminal ID field 152, a username field 154, an icon filename field 156, a communication status field 158, a video chat field 160, a voice chat field 162, a title field 164, and a comment field 168. The terminal ID field 152 stores the terminal IDs of the game apparatuses 20. The username field 154 stores the names, nicknames, or the like of the users of the game apparatuses 20. The icon filename field 156, as will be described later, stores the names of icon files that contain image data to be displayed as icons for representing the game apparatuses 20 when displaying friend lists on the menu screens of the game apparatuses 20. The communication status field 158 stores the current communication statuses of the game apparatuses 20. For example, when a game apparatus 20 logs on to the management server 30, it has a communication status "log-on." When it logs off the management server 30, the communication status becomes "log-off." The video chat field 160 stores information indicating whether or not the users can video chat. The voice chat field 162 stores information indicating whether or not the users can voice chat. The title field 164 stores the titles of games running on the game apparatuses 20, the titles of contents playing, or the like. The comment field 168 stores comments registered by users.

Figure 4:
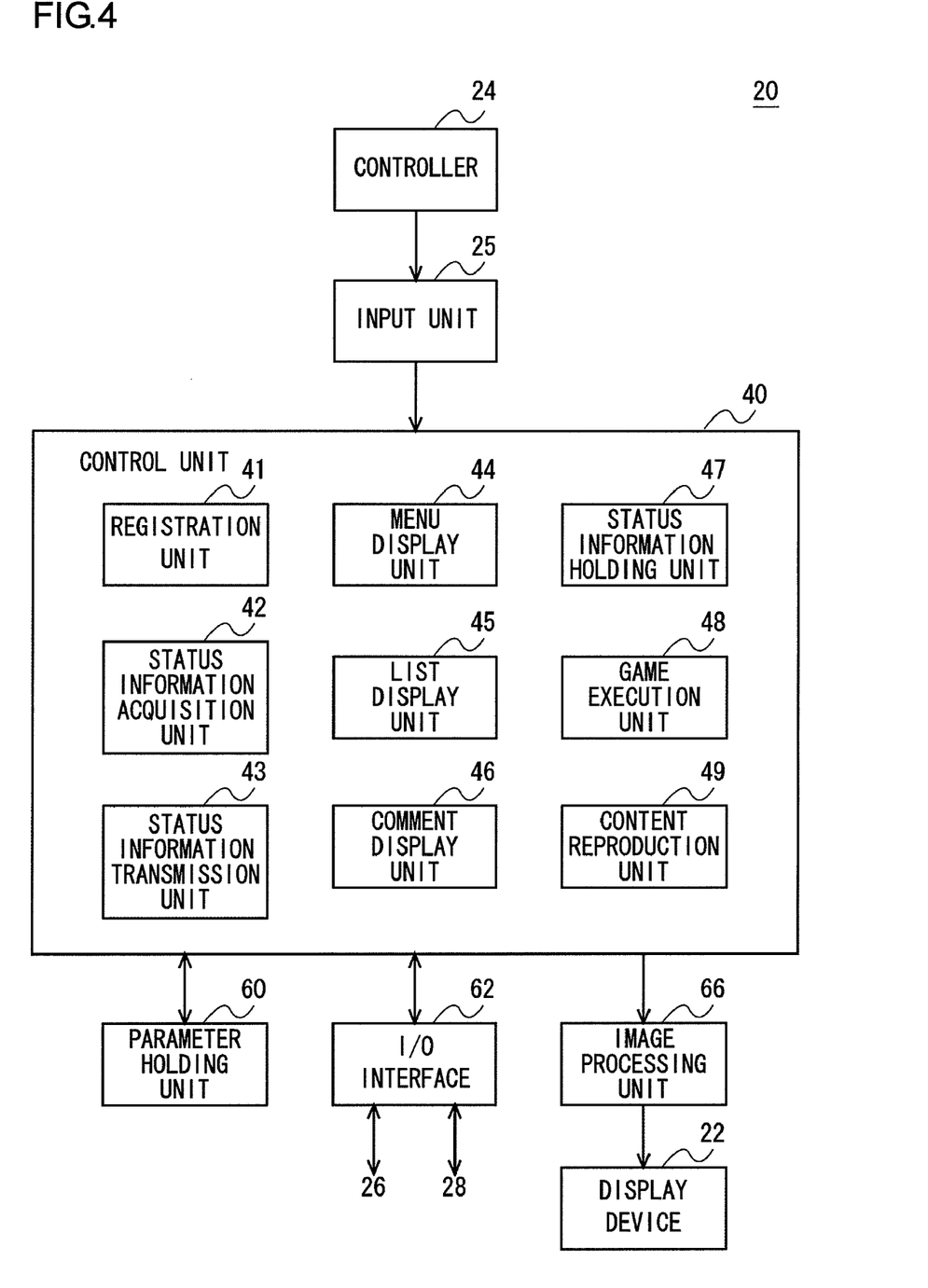
FIG. 4 is a diagram showing the configuration of a game apparatus.

FIG. 4 shows the configuration of the game apparatuses 20. A game apparatus 20 includes a controller 24, an input unit 25, a control unit 40, a parameter holding unit 60, an I/O interface 62, an image processing unit 66, and a display device 22. In terms of hardware, these components are realized by a CPU of an arbitrary computer, a memory, a program loaded into the memory, and so on. This diagram shows functional blocks to be achieved by the cooperation of these components, however. It will thus be understood by those skilled in the art that these functional blocks may be achieved in various forms including hardware alone, software alone, or a combination of these.

The input unit 25 accepts user's operation instructions which are input from the controller 24, being an example of the user interface. The I/O interface 62 controls input and output of data from/to the optical disk 26 and the memory card 28. The control unit 40 executes a game program based on the user's operation instructions accepted by the input unit 25, thereby making the game progress. The control unit 40 also reproduces contents stored in the optical disk 26, the memory card 28, and the like. The parameter holding unit 60 retains parameters necessary for the progress of the game. The image processing unit 66 generates the display screen of the game or contents controlled by the control unit 40, and displays it on the display device 22.

The control unit 40 includes a registration unit 41, a status information acquisition unit 42, a status information transmission unit 43, a menu display unit 44, a list display unit 45, a comment display unit 46, a status information holding unit 47, a game execution unit 48, and a content reproduction unit 49. The game execution unit 48 executes a game program which is read from the optical disk 26 or the like. The contents reproduction unit 49 reproduces contents which are read from the optical disk 26, the memory card 28, or the like.

The registration unit 41 registers friends of the user of own apparatus into the management server 30. The status information acquisition unit 42 acquires status information on the registered friends from the management server 30. The status information holding unit 47 retains the status information on the friends, acquired by the status information acquisition unit 42. The status information transmission unit 43 transmits status information on the own apparatus to the management server 30 when in connection with the network 32.

The menu display unit 44 generates a menu screen on which the user makes a selection and provides instructions based on the individual functions of the game apparatus 20. The list display unit 45 displays the friend list and the status information on the friends, acquired by the status information acquisition unit 42 on the menu screen. The comment display unit 46 displays a user-selected friend distinctively from the rest of the friend list displayed by the list display unit 45. If the information indicating the statuses of the friends includes any comment from the user of that game apparatus to the users of game apparatuses 20 by which the game apparatus is registered as a participant of notification, the comment display unit 46 also displays the comment on the menu screen.

Figure 5:
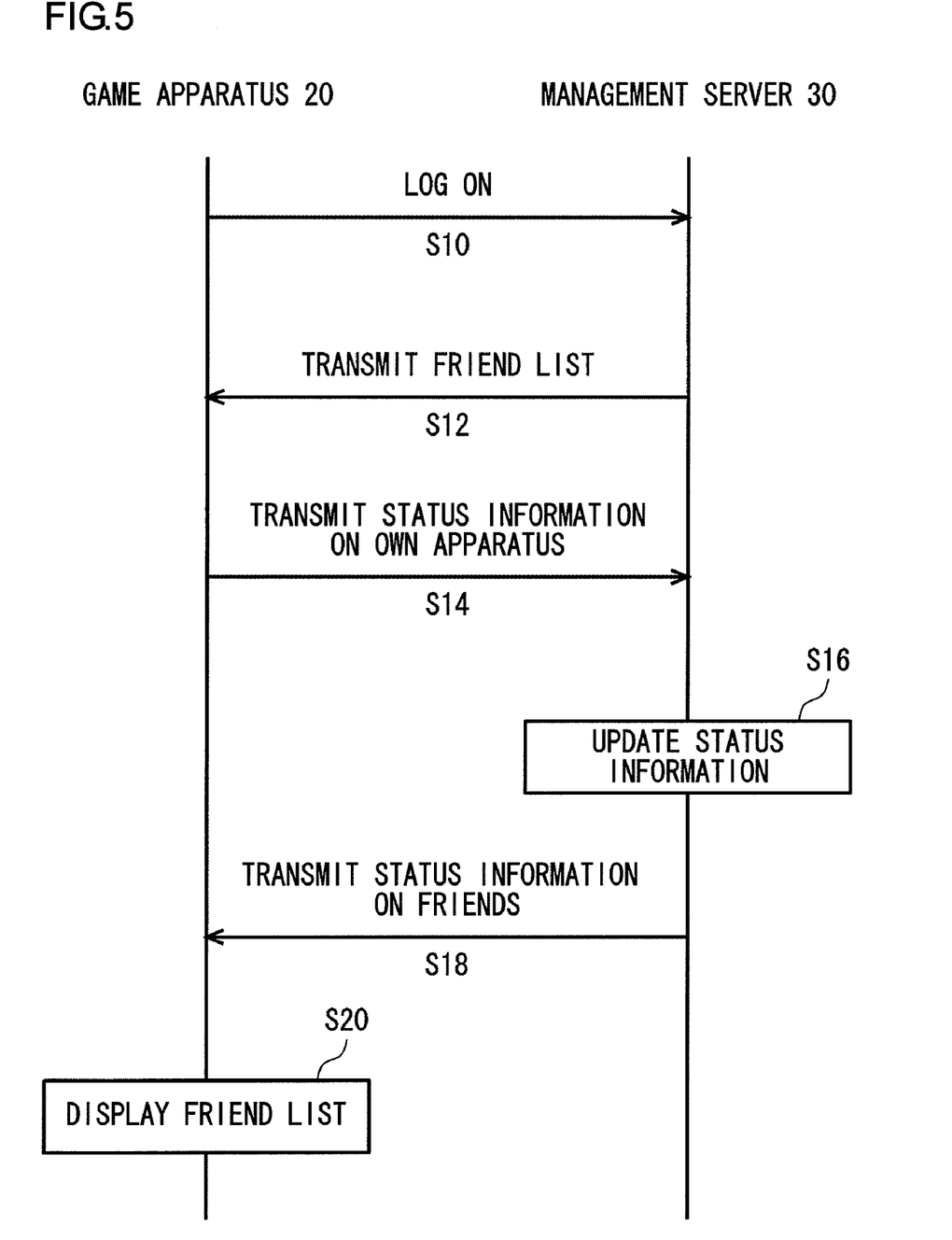
FIG. 5 is a sequence diagram showing a procedure by which a management server notifies status information to the game apparatus.

FIG. 5 is a sequence diagram showing a procedure by which the management server 30 notifies status information to a game apparatus 20. When the game apparatus 20 logs on to the management server 30 (S10), the management server 30 consults the user database 34 and transmits the list of friends registered by the game apparatus 20 to the game apparatus 20 (S12). Then, the status information transmission unit 43 of the game apparatus 20 transmits the status information on the own apparatus to the management server 30 (S14). The management server 30 updates the status information on the game apparatus 20, stored in the status management database 36 (S16). The management server 30 reads the status information on the friends of the game apparatus 20 from the status management database 36, and transmits it to the game apparatus 20 (S18). The status information acquisition unit 42 of the game apparatus 20 acquires and stores the status information into the status information holding unit 47, and the list display unit 45 displays the friend list on the menu screen (S20). The game apparatus 20 subsequently transmits its status information to the management server 30 (S14) when its own status changes. The management server 30 updates the status information on the game apparatus 20 (S16), and notifies the updating of the status information to game apparatuses 20 by which the game apparatus 20 is registered as a friend (S18).

Figure 6:
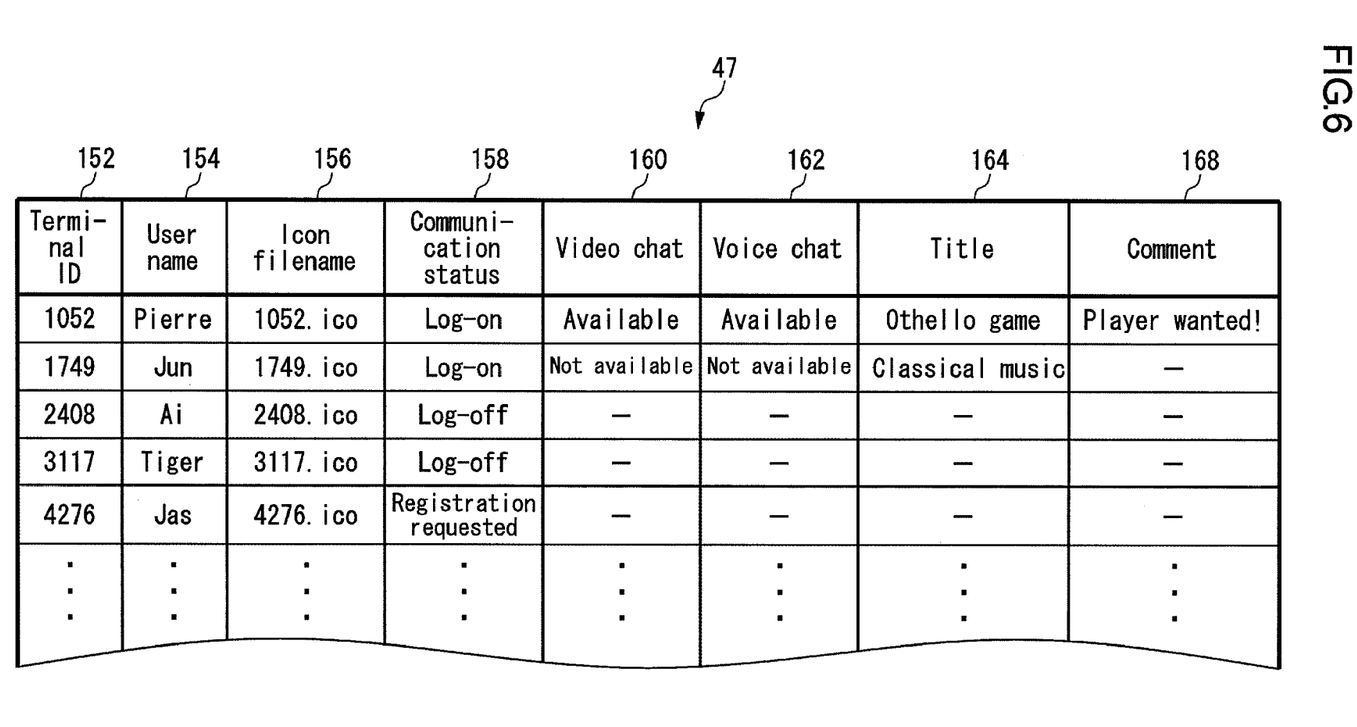
FIG. 6 is a diagram showing an example of internal data of a status information holding unit.

FIG. 6 shows an example of the internal data in the status information holding unit 47. Like the status management database 36 which is managed by the management server 30, the status information holding unit 47 includes a terminal ID field 152, a username field 154, an icon filename field 156, a communication status field 158, a video chat field 160, a voice chat field 162, a title field 164, and a comment field 168. As described above, when the game apparatus 20 logs on to the management server 30, the status information acquisition unit 42 acquires from the management server 30 the status information on other game apparatuses 20 that are registered as friends by the game apparatus 20. The status information acquisition unit 42 then stores the status information into the status information holding unit 47. Subsequently, when the status information acquisition unit 42 is notified from the management server 30 of the updating of the status information on a friend, it modifies the corresponding status information on that friend, stored in the status information holding unit 47.

Figure 7:
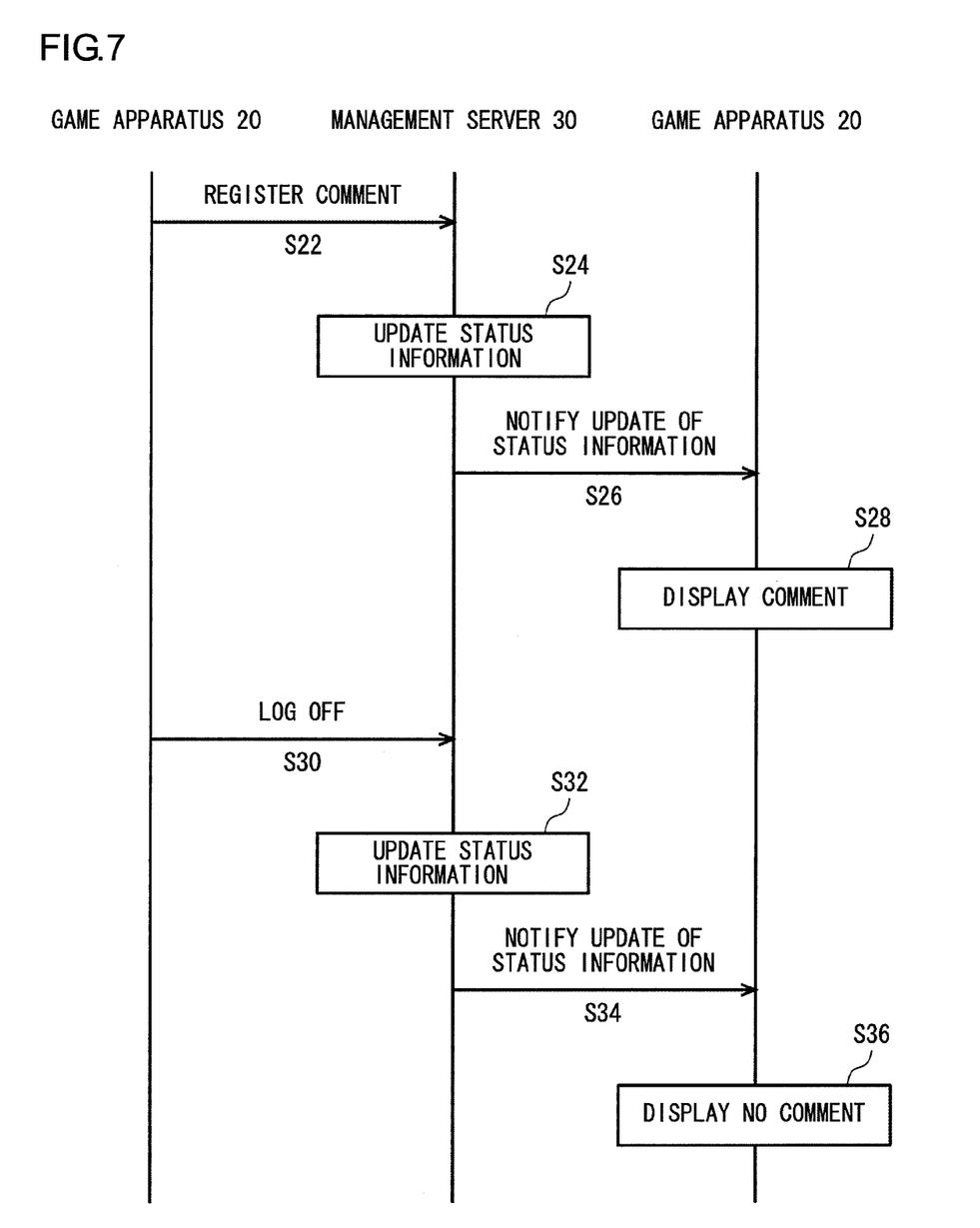
FIG. 7 is a sequence diagram showing a procedure by which a comment registered by a game apparatus is displayed on another game apparatus.

FIG. 7 is a sequence diagram showing a procedure by which a comment registered by a game apparatus 20 is displayed on another game apparatus 20. When a game apparatus 20 logging on to the management server 30 registers a comment (S22), the management server 30 registers the comment into the status management database 36 and updates the status information on that game apparatus 20 (S24). The management server 30 then notifies the update to another game apparatus 20 logging on (S26). In the game apparatus 20 that is notified of the update, the status information acquisition unit 42 stores the notified comment into the status information holding unit 47. As will be described later, the comment display unit 46 displays the comment when the friend is focused on in the friend list (S28).

When the comment-registering game apparatus 20 logs off the management server 30 (S30), the management server 30 updates the status information on that game apparatus 20 (S32). In this instance, the registered comment may be deleted. The management server 30 notifies the update to the other log-on game apparatus 20 to which the game apparatus 20 is registered as a friend (S34). In the game apparatus 20 that is notified of the update, the status information acquisition unit 42 modifies the status information on that friend stored in the status information holding unit 47. When the friend logs off, the comment display unit 46 no longer displays the comment of that friend (S36). That is, in the present embodiment, comments are part of the status information that indicates the statuses of log-on users, and will not be displayed after the users log off. In this respect, a difference exists over a diary, profile, or the like that are published in social networking services.

Figure 8:
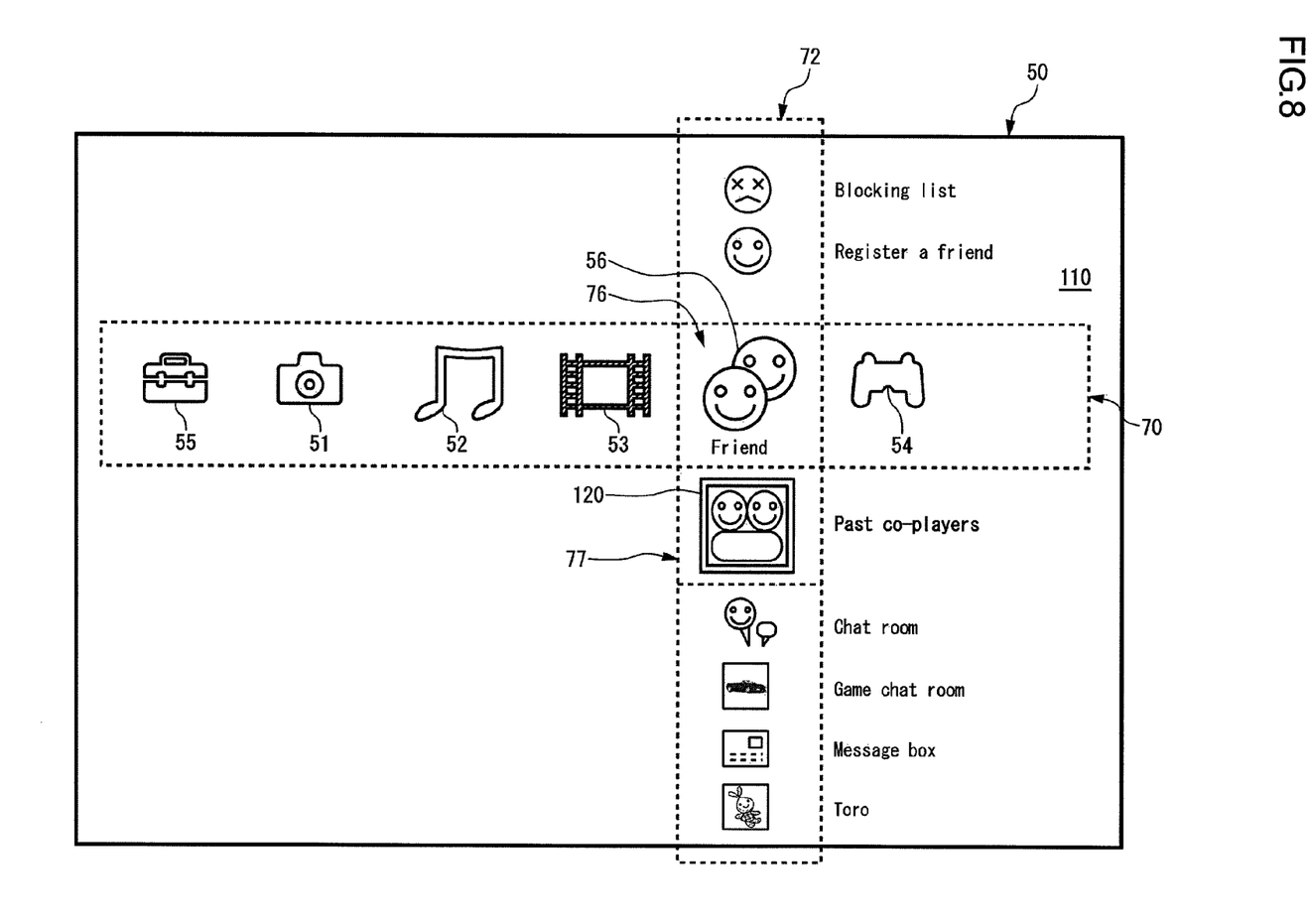
FIG. 8 is a diagram showing an example of display of a menu screen generated by the game apparatus.

FIG. 8 shows an example of the menu screen generated by the game apparatus 20. The menu screen 50 displays a two-dimensional arrangement of icons in which a plurality of functional icons arranged in a horizontal direction, or a functional icon array 70, and a plurality of item icons arranged in a vertical direction, or an item icon array 72, intersect each other. The functional icon array 70 includes icons that represent the types of functions of the game apparatus 20, such as a photo icon 51, a music icon 52, a moving-image icon 53, a game icon 54, a configuration icon 55, and a friend icon 56. The item icon array 72 includes icons that represent menu items pertaining to each individual function. The menu screen 50 consisting of the functional icon array 70 and the item icon array 72 is an on-screen display, and is thus displayed as being superimposed on the game screen or content images. If the background area 110 displays a currently-running game screen, the entire area of the functional icon array 70 and the item icon array 72 may be colored so as to clearly distinguish them from the background image. The game screen may also be adjusted in brightness or the like in order to clearly distinguish them.

A functional icon that falls on an intersectional area 76, where the functional icon array 70 and the item icon array 72 intersect each other, is enlarged and colored in a different coloring than that of the other functional icons as shown in the diagram. The intersectional area 76 is located in a predetermined position on the menu screen 50. In response to user instructions to move to the right or left given from the controller 24, the entire functional icon array 70 moves to the right or left, and a functional icon falling on the intersectional area 76 changes color and size. The user can thus select desired functions simply by making directional instructions to the right and left.

The menu display unit 44 moves the functional icons to the right or left by scrolling the entire area of the functional icon array 70 horizontally. The menu display unit 44 displays the individual functional icons in the same color and the same size while moving them to the right or left, but changes the coloring and size of a functional icon alone that falls on the intersectional area 76. The menu display unit 44 may provide the different coloring by modifying various factors of the functional icon such as brightness, saturation, and hue, or by causing the icon to blink. Since the functional icon falling on the intersectional area 76 is displayed in a display mode different from that of the other functional icons, the user can easily select various functions.

The menu display unit 44 does not displays the item icon array 72 when the functional icons are moving to the right or left and none of the functional icons falls on the intersectional area 76. When any one of the functional icons comes into the intersectional area 76, the menu display unit 44 may display the item icon array 72 so as to spread out vertically from the intersectional area 76. Otherwise, the item icon array 72 spread in advance may be faded in on the menu screen 50. The user can check the functions corresponding to the functional icons simply by scrolling the functional icons to the right or left with respect to the intersectional area 76. Conversely, if an instruction to the right or left is given when the item icon array 72 is displayed on the screen, the menu display unit 44 displays the action of retracting the spread item icon array 72 into the intersectional area 76, or fading out the spread item icon array 76 from the menu screen 50.

A focus area 77, being an area for displaying a target item icon to be operated by the user, lies near the center of the menu screen 50. The menu display unit 44 displays the functional icon array 70 so that the intersectional area 76 is located near this focus area 77, or immediately above the focus area 77, as shown in the example provided in FIG. 8. The focus area 77 constitutes part of the item icon array 72.

While the input unit 25 is acquiring user instructions to move up or down, the individual item icons 120 move in the vertical directions according to the instructions. The menu display unit 44 moves the item icons 120 up or down by scrolling the entire area of the item icon array 72 vertically.

The menu display unit 44 displays the individual item icons 120 in the same size while moving them up or down, whereas only an item icon that falls on the focus area 77 is enlarged as a focus icon. The menu display unit 44 may also modify various factors of the focus icon such as brightness, saturation, and hue, or it may cause the icon to blink. The rest of the item icons 120 are displayed in a size smaller than that of the focus icon. Menu items corresponding to the item icons 120 are displayed near the focus area 77, or to the right as shown in the example provided in FIG. 8.

Figure 9:
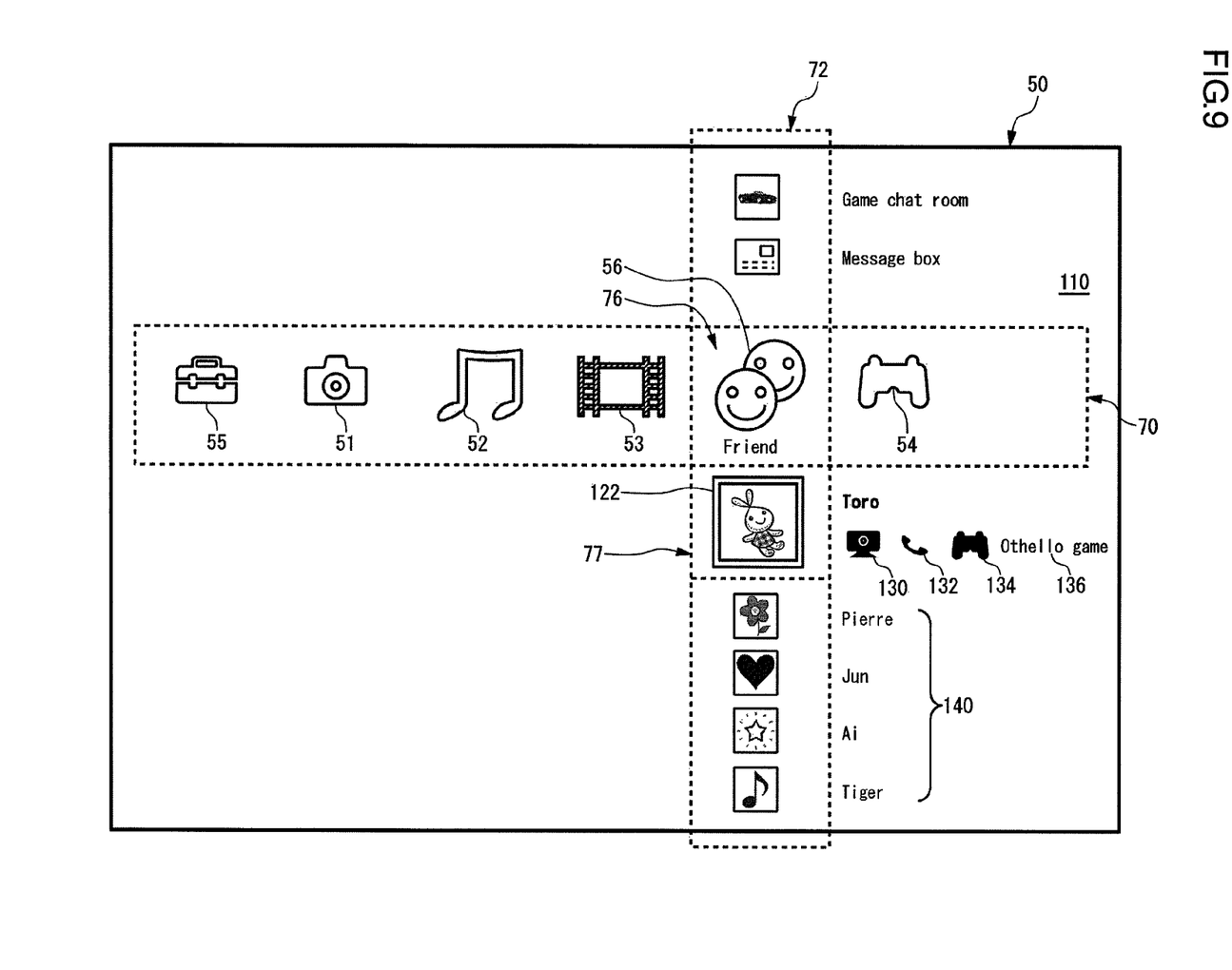
FIG. 9 is a diagram showing another example of display of the menu screen generated by the game apparatus.

FIG. 9 shows another example of the menu screen generated by the game apparatus 20. In FIG. 9, an icon 122 that represents the user's own apparatus, like an avatar, is displayed in the focus area 77. Status information that indicates the status of the participant's own apparatus is displayed on the right of the icon 122. In the example provided in FIG. 9, the status information displayed includes an icon 130 which indicates that video chat is available, an icon 132 which indicates that voice chat is available, an icon 134 which indicates that a game is running, and the title 136 of the game that is running. In this state, the user can make a predetermined operation instruction to enter a screen for setting status information, and register a comment. The registered comment is transmitted from the status information transmission unit 43 to the management server 30. Displayed below the information on the own apparatus is a friend list 140.

Figure 10:
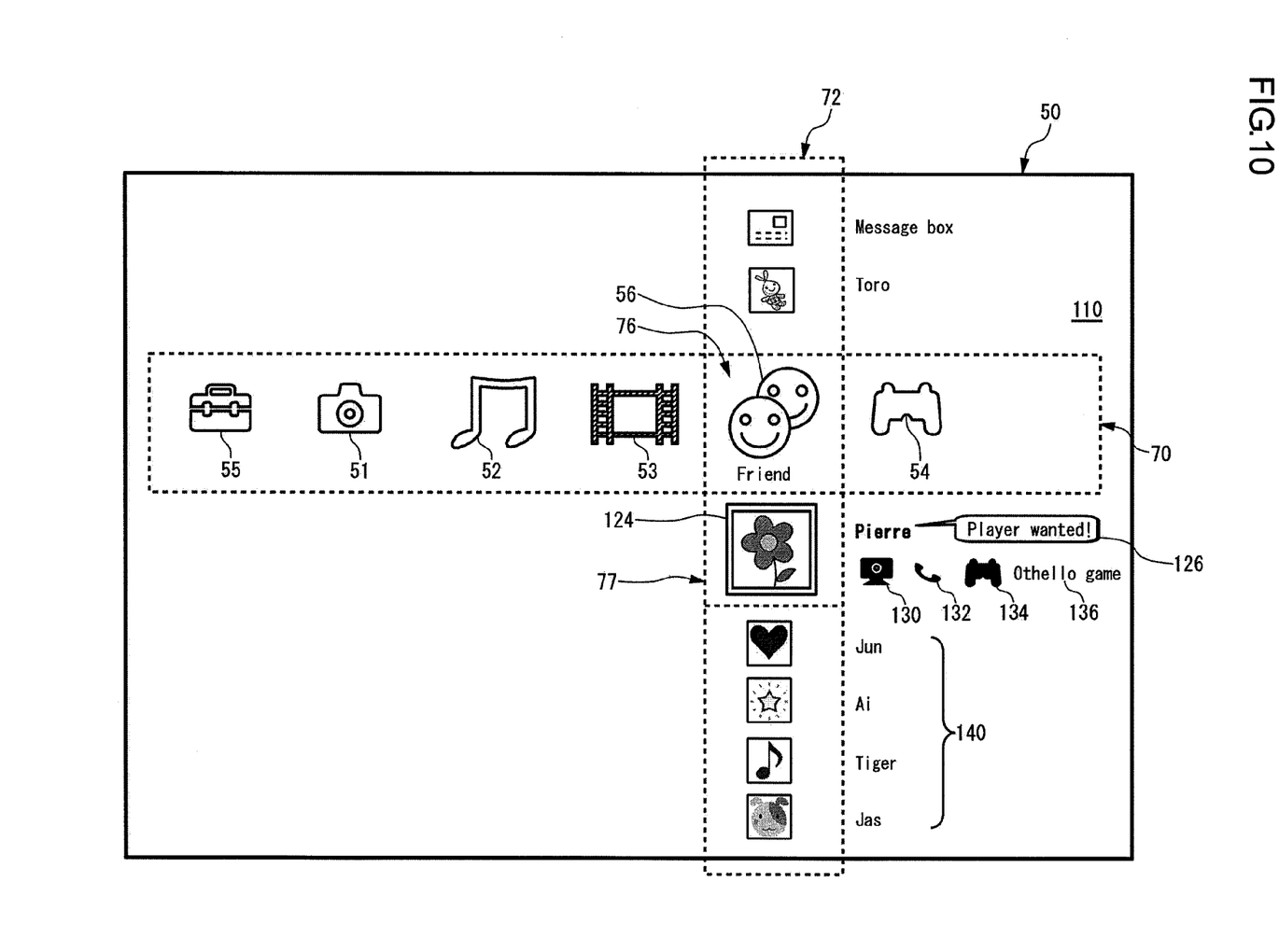
FIG. 10 is a diagram showing an example of display of the menu screen on which a friend list is displayed.

FIG. 10 shows an example of the menu screen on which a friend list is displayed. In FIG. 10, the list display unit 45 displays the friend list 140 on the item icon array 72. An icon 124 of a friend "Pierre" is displayed in the focus area 77, and status information indicating the status of the friend "Pierre" is displayed to the right of the icon 124. The status information on this friend includes a comment, and the comment display unit 46 displays a comment box 126 and the contents of the comment.

As shown in FIG. 10, the comment display unit 46 only shows the comment of the friend that is selected and displayed in the focus area 77. Even if the status information on the other friends includes any comments, those comments are not displayed on the menu screen. This avoids an excessive amount of information appearing on the menu screen, and can thus improve the viewability of the menu screen.

Figure 11:
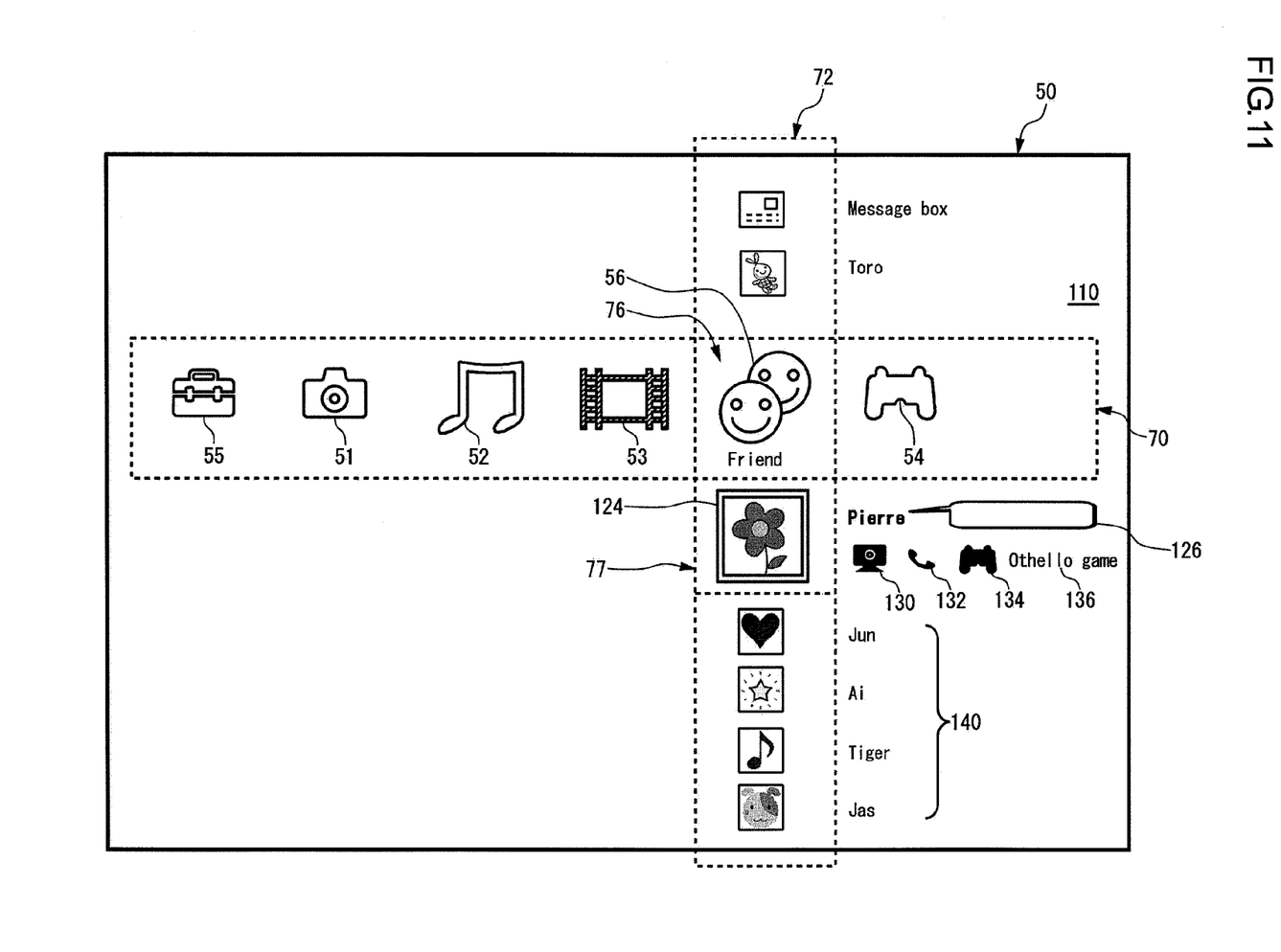
FIG. 11 is a diagram showing a situation where the friend list is scrolled on the menu screen.

FIG. 11 shows a situation where the friend list 140 is scrolled on the menu screen. As mentioned above, when instruction inputs for scrolling up and down the friend list 140 are accepted from the user, the menu display unit 44 scrolls up and down the entire item icon array 72. While scrolling through the friend list 140, the comment display unit 46 indicates whether or not the friends appearing in the focus area 77 include any comment by displaying or not displaying the comment box 126, and omits displaying the contents of the comments accordingly. This can save time necessary for reading and displaying the comments, thereby allowing for smooth scrolling. The displaying of the contents of comments can be omitted with ease since the contents of the comments would be hard for the user to read even if they were displayed while scrolling the friend list 140. If any comment is registered by friends, the comment box 126 will appear in the fixed position. The user can thus check for the presence or absence of comments without moving the point of view, and can therefore determine the presence or absence of any comments even during scrolling. When the scrolling is stopped, the contents of a comment is displayed along with the comment box 126, if any comment is registered by the friend appearing in the focus area 77 at that point in time.

Figure 12:
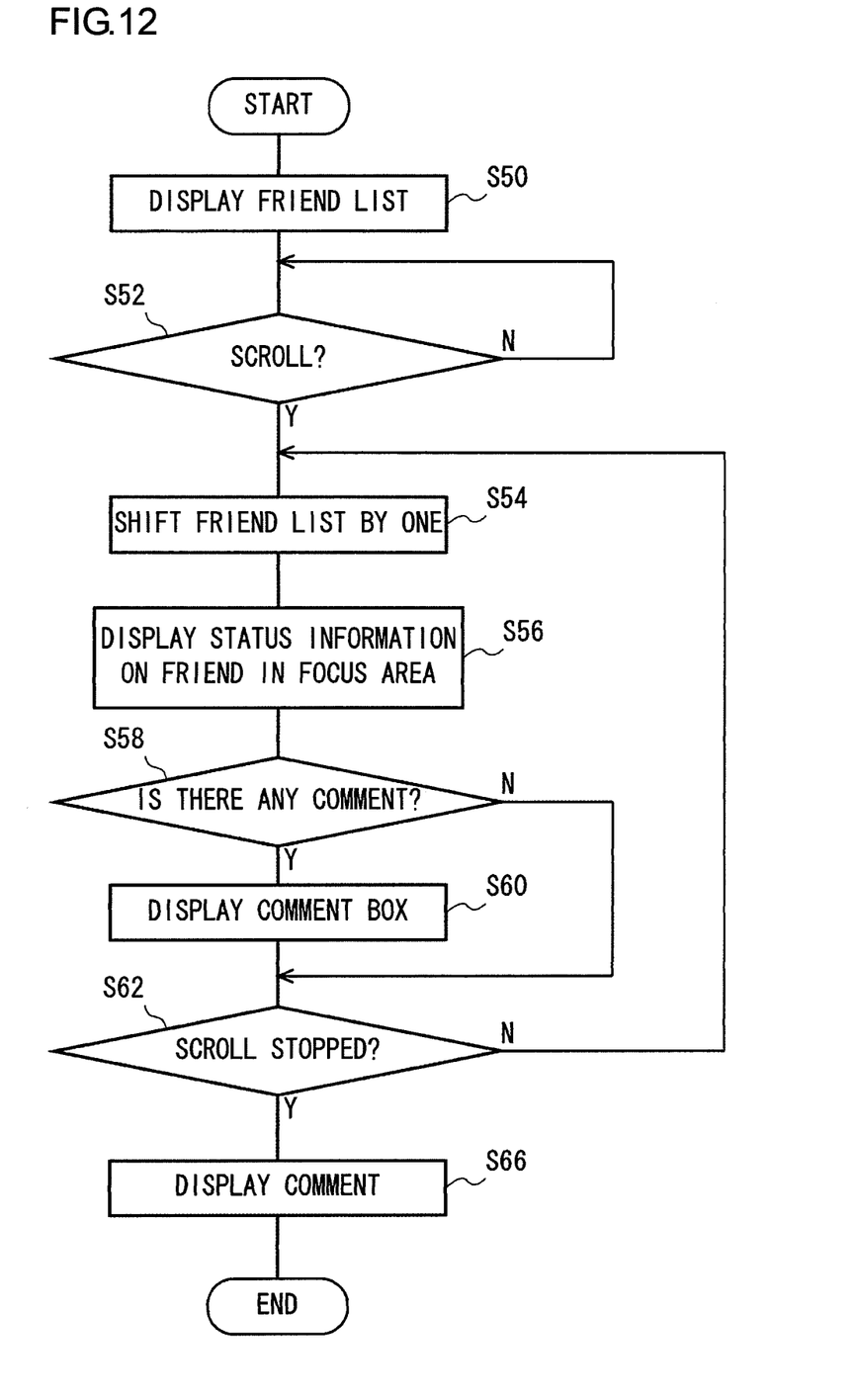
FIG. 12 is a flowchart showing the procedure for scrolling the friend list.

FIG. 12 is a flowchart showing the procedure for scrolling the friend list. The list display unit 45 displays the friend list 140 on the menu screen 50 (S50), and waits for an instruction for vertical scrolling (N at S52). When an instruction for scrolling is given (Y at S52), the friend list 140 is moved on by one in the specified direction (S54). The list display unit 45 consults the status information holding unit 47, displays the icon 124 of a friend that falls on the focus area 77, and displays the status information on the friend (S56). If any comment is registered by the friend (Y at S58), the comment box 126 alone is displayed (S60). If no comment is registered (N at s58), the comment box 126 is not displayed. Unless the scrolling is stopped (N at S62), the process returns to S54 so that the foregoing procedure is repeated to scroll the friend list 140. When the scrolling is stopped (Y at S62) and if any comment is registered by the friend that is displayed in the focus area 77 at that point, the contents of the comment are read from the status information and displayed (S66). The comment box 126 has already been displayed at S60. If there is no comment registered, no comment will be displayed. The foregoing procedure can achieve smooth scrolling and allows the user to check for the presence or absence of comments even during scrolling, providing improved user convenience. For faster scrolling, the displaying of friend icons 124 may be omitted during scrolling. The displaying of other status information may also be omitted.

Up to this point, the present invention has been described in conjunction with the embodiment thereof. It should be appreciated that this embodiment is provided solely by way of illustration. It will be understood by those skilled in the art that various modifications may be made to combinations of the foregoing components and processes, and all such modifications are also intended to fall within the scope of the present invention.

In the present embodiment, the menu screen is configured so that the intersectional area 76 is located immediately above the focus area 77. In a modification, the menu screen may have any configuration as long as the user can check the functional icons easily while placing the point of view on the focus icons. For example, the intersectional area 76 may be located immediately below or near the focus area 77.

In the present embodiment, the functional icon array 70 and the item icon array 72 are displayed on the menu screen 50 along the horizontal direction and the vertical direction, respectively. In a modification, the functional icon array 70 and the item icon array 72 may be arranged by utilizing the depth of the screen. For example, the functional icon array 70 and the item icon array 72 may be arranged as if they are pasted onto a virtual spherical surface in the screen, so that the icons rotate along the spherical surface according to user instructions to move to the top, bottom, right, or left. Alternatively, an icon that falls on the focus area may be displayed in a foremost position along an axis perpendicular to the screen with the other icons located behind along the axis perpendicular to the screen. In this mode, the icon falling on the focus area is displayed as if it pops up forward according to user instructions to move to the top, bottom, right, or left. The mode of displaying the functional icon array 70 and the item icon array 70 with depths and the mode of shrinking or defocusing unselected icons can be combined to provide the user with a sense of operating a menu in a virtual three-dimensional space.

In the present embodiment, the intersectional area 76 and the focus area 77 are positioned near the center of the screen 50. In a modification, the display positions of the intersectional area 76 and the focus area 77 may be freely set by the user.

What is claimed is:

1. A terminal apparatus comprising:
a registration unit that registers in a user database other terminals, which are accessible through a network as participants in order to notify each participant as to the other participants status;
an acquisition unit, which acquires information indicating the status of a respective terminal registered in the user database through the network, including information indicating a status message that a participant sets for itself, and stores the information in a status information holding unit;
a list display unit, which reads a list of the terminals registered in the user database from the status information holding unit and displays the list of the registered terminals on a screen; and
a comment display unit, which displays a terminal displayed in a focus area located in a predetermined position on a screen so as to make it distinctive from the rest of the icons on a list, and if there exists information indicating the status message of a participant on the respective terminal of the terminal icon displayed, the status message is read from the status information holding unit and displayed on the screen when the terminal icon is in the focus area,
wherein the list display unit displays a plurality of terminals registered in the user database in an array-like manner so as to scroll through a list of the plurality of terminals, and when scrolling through the entire list, one terminal is displayed in the focus area upon an input instruction from a user to scroll through the list for each position scrolled within the list, and
while the user is scrolling through the list of the plurality of terminals, the comment display unit extracts information from the status information holding unit on the existence of a status message and displays a message box if a status message exists for a terminal that is being displayed in a focus area, and, when the user stops scrolling through the list of the plurality of terminals, the comment display unit displays in the message box the status message of a terminal that is being displayed in the focus area if the status message exists for the terminal being displayed.

2. The terminal apparatus according to claim 1, wherein when the comment display unit acquires information indicating that a terminal registered in the user database is disconnected from the network, the comment display unit displays no comment from the terminal.

3. A communication management method for use in a terminal apparatus, comprising:
registering, in a user database, other terminals that are accessible through a network as participants in order to notify each participant as to the status of the other participants;
acquiring information indicating the status of a respective terminal registered in the user database through the network, including information indicating a status message that a participant sets for itself, and storing the information in a status information holding unit;
reading a list of terminals registered in the user database from the status information holding unit and displaying the list of the registered terminals on a screen; and
displaying a terminal displayed in a focus area located in a predetermined position on a screen so as to make the terminal distinctive from the rest of the icons on a list, and if there exists information indicating the status message of a participant on the respective terminal of the terminal icon displayed, the status message is read from the status information holding unit and displayed on the screen when the terminal icon is in the focus area
wherein the displaying of a list displays a plurality of terminals registered in the user database in an array-like manner so as to scroll through a list of the plurality of terminals, and when scrolling through the entire list, one terminal is displayed in the focus area upon an input instruction from a user to scroll through the list for each position scrolled within the list, and
while the user is scrolling through the list of the plurality of terminals, the displaying of a comment refers to the status information holding unit and displays a message box if a status message exists for a terminal that is being displayed in a focus area, and, when the user stops scrolling through the list of the plurality of terminals, the status message of a terminal that is being displayed in the focus area is displayed in the message box if the status message exists for the terminal being displayed.

4. A non-transitory computer-readable recording medium storing a program for use in a terminal apparatus, comprising:
a module configured to register, in a user database, other terminals that are accessible through a network as participants in order to notify each participant as to the status of the other participants;
a module configured to acquire information indicating a status of a respective terminal registered in the user database through the network, including information indicating a status message that a participant sets for itself, and store the information in a status information holding unit;
a module configured to read a list of terminals registered in the user database from the status information holding unit display the list of the registered terminals on a screen; and
a module configured to display a terminal displayed in a focus area located in a predetermined position on a screen so as to make the terminal distinctive from the rest of the icons on a list, and if there exists information indicating the status message of a participant on the respective terminal of the terminal icon displayed, the status message is read from the status information holding unit and displayed on the screen when the terminal icon is in the focus area,
wherein the module for displaying a list displays a plurality of terminals registered in the user database an array-like manner so as to scroll through a list of the plurality of terminals, and when scrolling through the entire list, one terminal is displayed in the focus area upon an input instruction from a user to scroll through the list for each position scrolled within the list, and
while the user is scrolling through the list of the plurality of terminals, the module for displaying a comment extracts information from the status information holding unit on the existence of a status message and displays a message box if a status message exists for a terminal that is being displayed in a focus area, and, when the user stops scrolling through the list of the plurality of terminals, the module for displaying a comment displays in the message box the status message of a terminal that is being displayed in the focus area if the status message exists for the terminal being displayed.

* * * * *